US012111495B2

(12) United States Patent
Bian

(10) Patent No.: US 12,111,495 B2
(45) Date of Patent: Oct. 8, 2024

(54) MULTIPLE-TIP EDGE COUPLERS WITH SEGMENTED WAVEGUIDE CORES

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

(*) Notice: Subject to any disclaimer, the term of this patent is extended or adjusted under 35 U.S.C. 154(b) by 136 days.

(21) Appl. No.: 17/828,139

(22) Filed: May 31, 2022

(65) Prior Publication Data

US 2023/0384518 A1   Nov. 30, 2023

(51) Int. Cl.
*G02B 6/12* (2006.01)
*G02B 6/122* (2006.01)
*G02B 6/30* (2006.01)

(52) U.S. Cl.
CPC ....... *G02B 6/1228* (2013.01); *G02B 6/12004* (2013.01); *G02B 6/305* (2013.01); *G02B 2006/12097* (2013.01); *G02B 2006/12111* (2013.01); *G02B 2006/12121* (2013.01); *G02B 2006/12147* (2013.01)

(58) Field of Classification Search
CPC .. G02B 6/1228; G02B 6/12004; G02B 6/305; G02B 2006/12097; G02B 2006/12111; G02B 2006/12121; G02B 2006/12147; G02B 6/122
USPC ........ 385/12, 14, 27, 28, 30, 39, 43, 49, 50, 385/129
See application file for complete search history.

(56) References Cited

U.S. PATENT DOCUMENTS

| | | | |
|---|---|---|---|
| 10,816,726 B1 | 10/2020 | Peng et al. | |
| 11,215,756 B2 | 1/2022 | Bian et al. | |
| 2018/0120504 A1 | 5/2018 | Qi et al. | |
| 2020/0259256 A1 | 8/2020 | Yu et al. | |
| 2021/0191042 A1* | 6/2021 | Peng | G02B 6/305 |
| 2021/0278611 A1 | 9/2021 | Sahin et al. | |
| 2021/0333474 A1* | 10/2021 | Bian | G02B 6/13 |
| 2022/0043207 A1 | 2/2022 | Bian | |
| 2022/0146862 A1* | 5/2022 | Bian | G02F 1/0147 |
| 2023/0266530 A1* | 8/2023 | Bian | G02B 6/136 385/129 |

OTHER PUBLICATIONS

Yu, Qianchen et al., "A trident edge coupler for lithium niobate thin film." Proceedings of the SPIE, vol. 11455, id. 114552T 5 pp., DOI: 10.1117/12.2564042 (2020).

(Continued)

*Primary Examiner* — Kaveh C Kianni
(74) *Attorney, Agent, or Firm* — Thompson Hine LLP; Anthony Canale

(57) ABSTRACT

Structures for an edge coupler and methods of fabricating a structure for an edge coupler. The structure comprises an edge coupler including a first waveguide core and a second waveguide core adjacent to the first waveguide core in a lateral direction. The first waveguide core includes a first section with a first thickness and a first plurality of segments projecting in a vertical direction from the first section. The second waveguide core includes a second section with a second thickness and a second plurality of segments projecting in the vertical direction from the second section.

20 Claims, 11 Drawing Sheets

(56) References Cited

OTHER PUBLICATIONS

European Patent Office, Extended European Search Report and Written Opinion issued in European Patent Application No. 22200571.2 on Jun. 1, 2023 (9 pages).
M. Teng et al., "Trident Shape SOI Metamaterial Fiber-to-Chip Edge Coupler," 2019 Optical Fiber Communications Conference and Exhibition (OFC), pp. 1-3 (2019).
N. Hatori et al., "A Hybrid Integrated Light Source on a Silicon Platform Using a Trident Spot-Size Converter," in Journal of Lightwave Technology, vol. 32, No. 7, pp. 1329-1336, doi: 10.1109/JLT.2014.2304305 (Apr. 1, 2014).
Y.-C. Tu, P.-H. Fu and D.-W. Huang, "High-Efficiency Ultra-Broadband Multi-Tip Edge Couplers for Integration of Distributed Feedback Laser With Silicon-on-Insulator Waveguide," in IEEE Photonics Journal, vol. 11, No. 4, pp. 1-13, Aug. 2019, Art No. 6602113, doi: 10.1109/JPHOT.2019.2924477 (Aug. 2019).
W. Liu, J. Zhang, L. Liu, D. Dai and Y. Shi, "High Efficiency Silicon Edge Coupler Based On Uniform Arrayed Waveguides With Un-Patterned Cladding," in IEEE Photonics Technology Letters, vol. 32, No. 17, pp. 1077-1080, 1, doi: 10.1109/LPT.2020.3011188 (Sep. 1, 2020).
Xia Chen, David J. Thomson, Lee Crudginton, Ali Z. Khokhar, and Graham T. Reed, "Dual-etch apodised grating couplers for efficient fibre-chip coupling near 1310 nm wavelength," Opt. Express 25, 17864-17871 (2017).
B. Bhandari, C. Im, M. Oh, and S. Lee, "Compact Edge-Coupler for Broadband and High-Efficient Fiber-to-Waveguide Coupling Using Cascaded Silicon Nitride Tapers," in 26th Optoelectronics and Communications Conference, P. Alexander Wai, H. Tam, and C. Yu, eds., OSA Technical Digest (Optica Publishing Group, 2021), paper W2C.2.
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.
M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).
Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).
Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group), paper M5A.2 (2021).
B. Peng et al., "A Cmos Compatible Monolithic Fiber Attach Solution with Reliable Performance and Self-alignment," In Optical Fiber Communication Conference (Ofc), Osa Technical Digest (Optica Publishing Group, 2020), paper Th3l.4 (2020).
Y. Bian et al., "Monolithically integrated silicon nitride platform," 2021 Optical Fiber Communications Conference and Exhibition (OFC), pp. 1-3 (2021).
Pandey, Shesh Mani et al., "Multiple-Core Heterogeneous Waveguide Structures Including Multiple Slots" filed on Jan. 31, 2022 as a U.S. Appl. No. 17/588,440.
Krishnamurthy, Subramanian et al., "Optical Power Splitters With a Tailored Splitting Ratio" filed on Jun. 25, 2021 as a U.S. Appl. No. 17/358,255.
Dezfulian, Kevin K. et al., "Hybrid Edge Couplers With Layers in Multiple Levels" filed on Feb. 8, 2021 as a U.S. Appl. No. 17/169,971.
Sahin, Asli et al., "Photonics Integrated Circuit With Silicon Nitride Waveguide Edge Coupler" filed on Feb. 19, 2021 as a U.S. Appl. No. 17/179,532.
Bian, Yusheng et al., "Edge Couplers in the Back-End-Of-Line Stack of a Photonics Chip" filed on Jan. 19, 2021 as a U.S. Appl. No. 17/151,955.
Bian, Yusheng et al., "Metamaterial Edge Couplers in the Back-End-Of-Line Stack of a Photonics Chip" filed on Feb. 11, 2021 as a U.S. Appl. No. 17/173,639.
Bian, Yusheng "Edge Couplers With Metamaterial Rib Features" filed on Jul. 7, 2021 as a U.S. Appl. No. 17/369,253.
Bian, Yusheng "Edge Couplers With Confining Features" filed on Oct. 4, 2021 as a U.S. Appl. No. 17/493,260.
Holt, Judson R. et al., "Silicon-On-Insulator Chip Structure With Substrate-Embedded Optical Waveguide and Method" filed on Dec. 23, 2020 as a U.S. Appl. No. 17/131,997.
Letavic, Theodore et al., "Hybrid Edge Couplers With Stacked Inverse Tapers" filed on Aug. 19, 2021 as a U.S. Appl. No. 17/406,773.
Bian, Yusheng "Waveguides and Edge Couplers With Multiple-Thickness Waveguide Cores" filed on Apr. 26, 2022 as a U.S. Appl. No. 17/729,244.

* cited by examiner

MULTIPLE-TIP EDGE COUPLERS WITH SEGMENTED WAVEGUIDE CORES

BACKGROUND

The disclosure relates to photonics chips and, more specifically, to structures for an edge coupler and methods of fabricating a structure for an edge coupler.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

An edge coupler, also known as a spot-size converter, is an optical component that is commonly used for coupling light of a given mode from a light source, such as a laser or an optical fiber, to other optical components on the photonics chip. The edge coupler may include a section of a waveguide core that defines an inverse taper having a tip. In the edge coupler construction, the narrow end of the inverse taper provides a facet at the tip that is positioned adjacent to the light source, and the wide end of the inverse taper is connected to another section of the waveguide core that routes the light to the optical components of the photonics chip.

The gradually-varying cross-sectional area of the inverse taper supports mode transformation and mode size variation associated with mode conversion when light is transferred from the light source to the edge coupler. The tip of the inverse taper is unable to fully confine the incident mode received from the light source because the cross-sectional area of the tip is considerably smaller than the mode size. Consequently, a significant percentage of the electromagnetic field of the incident mode is distributed about the tip of the inverse taper. As its width increases, the inverse taper can support the entire incident mode and confine the electromagnetic field.

Improved structures for an edge coupler and methods of fabricating a structure for an edge coupler are needed.

SUMMARY

In an embodiment of the invention, a structure comprises an edge coupler including a first waveguide core and a second waveguide core adjacent to the first waveguide core in a lateral direction. The first waveguide core includes a first section with a first thickness and a first plurality of segments projecting in a vertical direction from the first section. The second waveguide core includes a second section with a second thickness and a second plurality of segments projecting in the vertical direction from the second section.

In an embodiment of the invention, a method comprises forming an edge coupler including a first waveguide core and a second waveguide core adjacent to the first waveguide core in a lateral direction. The first waveguide core includes a first section with a first thickness and a first plurality of segments projecting in a vertical direction from the first section. The second waveguide core includes a second section with a second thickness and a second plurality of segments projecting in the vertical direction from the second section.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
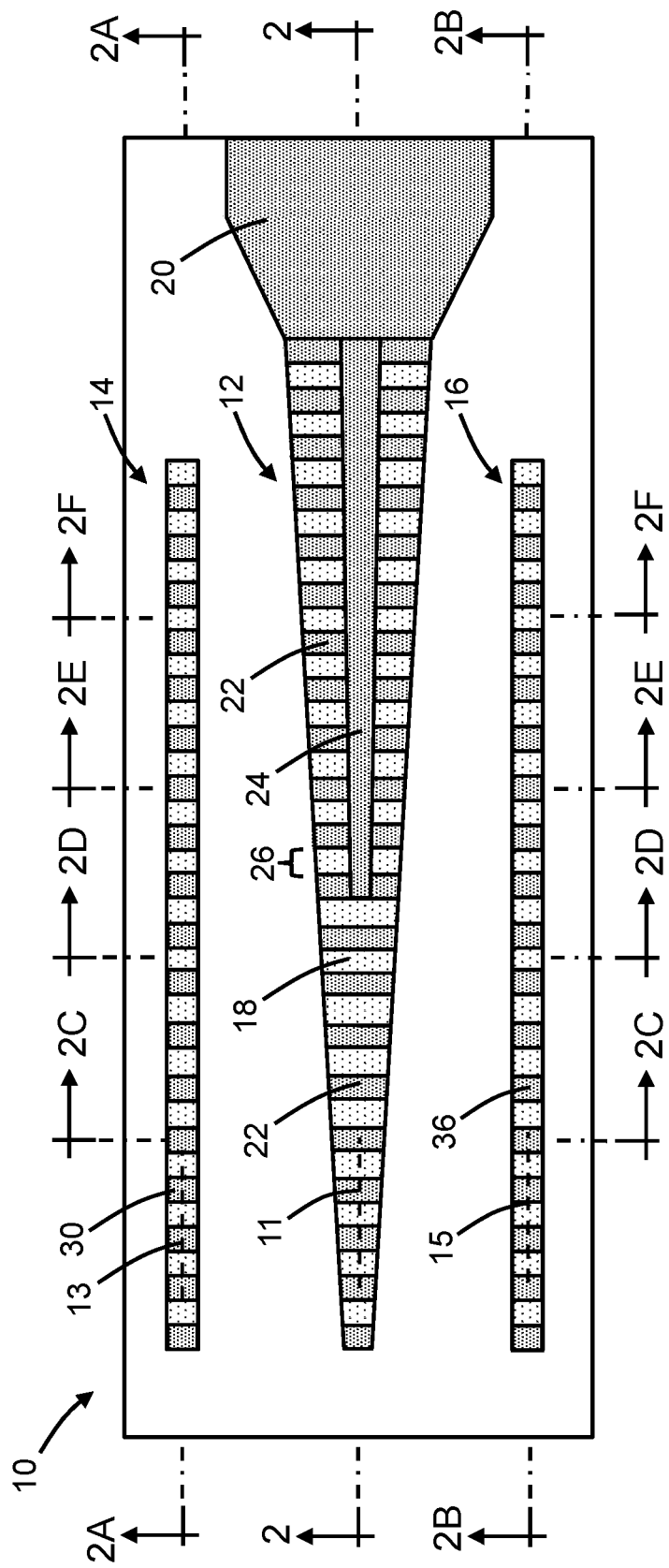
FIG. 1 is a top view of a structure at an initial fabrication stage of a processing method in accordance with embodiments of the invention.

With reference to FIGS. 1, 2, 2A, 2B, 2C, 2D, 2E, 2F and in accordance with embodiments of the invention, a structure 10 for a multiple-tip edge coupler includes a waveguide core 12, a waveguide core 14 that is positioned adjacent to the waveguide core 12, and a waveguide core 16 that is also positioned adjacent to the waveguide core 12. The waveguide cores 12, 14, 16 are aligned with respective longitudinal axes 11, 13, 15. The waveguide cores 12, 14, 16 have a side-by-side arrangement with the waveguide core 12 positioned in a lateral direction between the waveguide core 14 and the waveguide core 16. In an embodiment, the waveguide cores 14, 16 may be symmetrically positioned relative to the waveguide core 12.

The waveguide core 12 includes a section 18, a section 20 connected to the section 18, segments 22 that project in a vertical direction from the section 18, and a taper 24 that is overlaid with the segments 22 on at least a portion of the section 18. Adjacent pairs of the segments 22 are separated by gaps 26 defined by trenches that may extend across the full width of the waveguide core 12 in a lateral direction transverse to the longitudinal axis 11 and partially through the waveguide core 12 in a vertical direction. The section 18 has a thickness T1, the section 20 has a thickness T2, and the segments 22 may have a height equal to a difference between the thickness T1 and the thickness T2. The depth of the trenches in the waveguide core 12 determines the height of the segments 22. In an embodiment, the thickness T1 of the section 18 may be constant or substantially constant over its length. In an embodiment, the thickness T2 may be greater than the thickness T1. In an embodiment, the thickness T2 may be equal to about 800 nanometers.

The waveguide core 12 terminates at one end, and the opposite end of the waveguide core 12 is coupled at an opposite end by the section 20 with optical components on a photonics chip. The segments 22 and section 18 of the waveguide core 12 may define an inverse taper having a width that increases with increasing distance from the terminating end of the waveguide core 12. An inverse taper refers to a tapered section of a waveguide core characterized by a gradual increase in width along a mode propagation direction. In an embodiment, the width of the segments 22 and section 18 of the waveguide core 12 may increase linearly. In an alternative embodiment, the width of the segments 22 and section 18 of the waveguide core 12 may increase based on a non-linear function, such as a quadratic function, a cubic function, a parabolic function, a sine function, a cosine function, a Bezier function, or an exponential function.

The taper 24 may have a height equal to the height of the segments 22. In an alternative embodiment, the taper 24 may be lengthened to overlap with more of the segments 22 than in the representative embodiment. In an alternative embodiment, the taper 24 may be lengthened to overlap with all of the segments 22 over the entire length of the section 18. In an alternative embodiment, the taper 24 may be either shortened to overlap with fewer of the segments 22 than in the representative embodiment. In an alternative embodiment, the taper 24 may be omitted.

In an embodiment, the pitch and duty cycle of the segments 22 may be uniform to define a periodic arrangement. In alternative embodiments, the pitch and/or the duty cycle of the segments 22 may be apodized (i.e., non-uniform) to define a non-periodic arrangement. The segments 22 may be dimensioned and positioned at small enough pitch so as to define a sub-wavelength grating-like structure that does not radiate or reflect light at a wavelength of operation.

The waveguide core 12 may include one or more additional sections (not shown) similar to section 18 having a thickness that is less than the thickness T2 and from which segments 22 project in a vertical direction. For example, the waveguide core 12 may include an additional section with projecting segments 22 and a thickness that is greater than the thickness T1 and less than the thickness T2, and the additional section may be longitudinally positioned between the section 18 and the section 20.

The waveguide core 14, which is terminated at opposite ends, includes a section 28 and segments 30 that project in a vertical direction from the section 28. Adjacent pairs of the segments 30 are separated by gaps 32 defined by trenches that may extend across the full width of the waveguide core 14 in a lateral direction transverse to the longitudinal axis 13 and partially through the waveguide core 14 in a vertical direction. The depth of the trenches in the waveguide core 14 may determine the height of the segments 30. The section 28 has a thickness T3, and the segments 30 have a height that may be equal to a difference between the thickness T3 and the thickness T2 of the section 20 of the waveguide core 12. In an embodiment, the thickness T3 of the section 28 may be equal to the thickness T1 of the section 18 of the waveguide core 12. In an alternative embodiment, the thickness T3 of the section 28 may be unequal to the thickness T1 of the section 18 of the waveguide core 12. In an embodiment, the height of the segments 30 may be equal to the height of the segments 22 of the waveguide core 12. In an alternative embodiment, the height of the segments 30 may be unequal to the height of the segments 22 of the waveguide core 12. In an embodiment, the waveguide core 14 may have a constant width over its length between the opposite terminating ends.

In an embodiment, the pitch and duty cycle of the segments 30 may be uniform to define a periodic arrangement. In alternative embodiments, the pitch and/or the duty cycle of the segments 30 may be apodized (i.e., non-uniform) to define a non-periodic arrangement. The segments 30 may be dimensioned and positioned at small enough pitch so as to define a sub-wavelength grating-like structure that does not radiate or reflect light at a wavelength of operation. The waveguide core 14 may include one or more additional sections (not shown) like section 28 that have a thickness that is, for example, greater than the thickness T3 and from which segments 30 project in a vertical direction.

The waveguide core 16, which terminates at opposite ends, includes a section 34 and segments 36 that project in a vertical direction from the section 34. Adjacent pairs of the segments 36 are separated by gaps 38 defined by trenches that may extend across the full width of the waveguide core 16 in a lateral direction transverse to the longitudinal axis 15 and partially through the waveguide core 16 in a vertical direction. The depth of the trenches in the waveguide core 16 may determine the height of the segments 36. The section 34 has a thickness T4, and the segments 36 may have a height equal to a difference between the thickness T4 and the thickness T2 of the section 20 of the waveguide core 12. In an embodiment, the thickness T4 of the section 34 may be equal to the thickness T1 of the section 18 of the waveguide core 12. In an alternative embodiment, the thickness T4 of the section 34 may be unequal to the thickness T1 of the section 18 of the waveguide core 12. In an embodiment, the thickness T4 of the section 34 may be equal to the thickness T3 of the section 28 of the waveguide core 14. In an embodiment, the height of the segments 36 may be equal to the height of the segments 22 of the waveguide core 12. In an alternative embodiment, the height of the segments 36 may be unequal to the height of the segments 22 of the waveguide core 12. In an embodiment, the height of the segments 36 may be equal to the height of the segments 30 of the waveguide core 14. In an alternative embodiment, the height of the segments 36 may be unequal to the height of the segments 30 of the waveguide core 14. In an embodiment, the waveguide core 16 may have a constant width over its length between the opposite terminating ends.

In an embodiment, the pitch and duty cycle of the segments 36 may be uniform to define a periodic arrangement. In alternative embodiments, the pitch and/or the duty cycle of the segments 36 may be apodized (i.e., non-uniform) to define a non-periodic arrangement. The segments 36 may be dimensioned and positioned at small enough pitch so as to define a sub-wavelength grating-like structure that does not radiate or reflect light at a wavelength of operation. The waveguide core 16 may include one or more additional sections (not shown) like section 34 that have a thickness that is, for example, greater than the thickness T3 and from which segments 36 project in a vertical direction.

In an embodiment, the segments 22, the segments 30, and the segments 36 may have the same periodicity. In an embodiment, the segments 22, the segments 30, and the segments 36 may have different periodicities. In an embodiment, the segments 22, the segments 30, and the segments 36 may have the same pitches and/or duty cycles. In an alternatively embodiment, the segments 22, the segments 30, and/or the segments 36 may have different pitches and/or duty cycles.

The waveguide cores 12, 14, 16 may be positioned in a vertical direction over a dielectric layer 40 and a substrate 42. In an embodiment, the dielectric layer 40 may be comprised of a dielectric material, such as silicon dioxide, and the substrate 42 may be comprised of a semiconductor material, such as single-crystal silicon. In an embodiment, the dielectric layer 40 may be a buried oxide layer of a silicon-on-insulator substrate, and the dielectric layer 40 may separate the waveguide cores 12, 14, 16 from the substrate 42. In an alternative embodiment, an additional dielectric layer comprised of, for example, silicon dioxide may separate the waveguide cores 12, 14, 16 from the dielectric layer 40.

In an embodiment, the waveguide cores 12, 14, 16 may be comprised of a material having a refractive index that is greater than the refractive index of silicon dioxide. In an embodiment, the waveguide cores 12, 14, 16 may be comprised of a dielectric material, such as silicon nitride. In an alternative embodiment, the waveguide cores 12, 14, 16 may be comprised of silicon oxynitride. In an alternative embodiment, the waveguide cores 12, 14, 16 may be comprised of a semiconductor material, such as silicon. In alternative embodiments, other materials, such as a polymer or a III-V compound semiconductor, may be used to form the waveguide cores 12, 14, 16.

In an embodiment, the waveguide cores 12, 14, 16 may be formed by patterning a layer of material with lithography and etching processes. In an embodiment, multiple lithography and etching processes may be used with different etch masks to form the waveguide cores 12, 14, 16 and to provide the different thicknesses of material.

Figure 2:
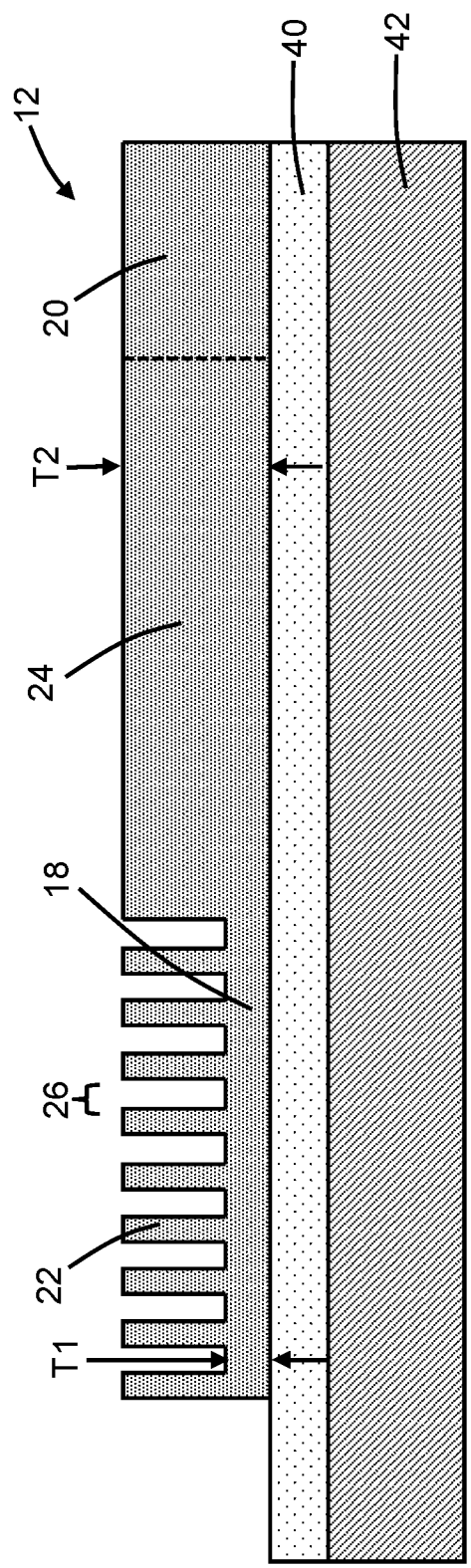
FIG. 2 is a cross-sectional view taken generally along line 2-2 in FIG. 1.
Figure 2A:
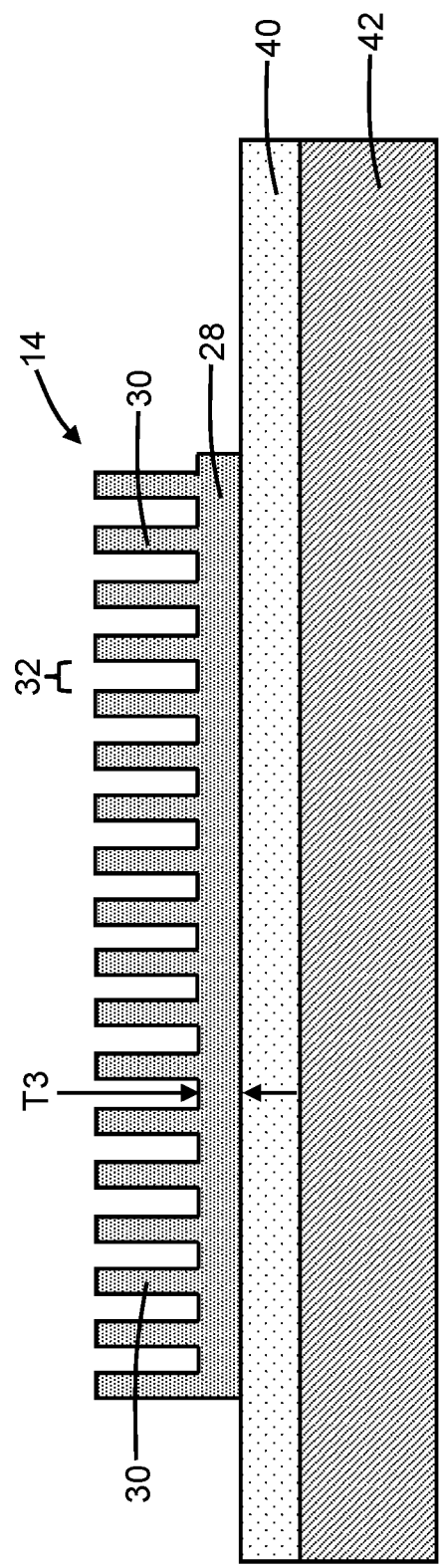
FIG. 2A is a cross-sectional view taken generally along line 2A-2A in FIG. 1.
Figure 2B:
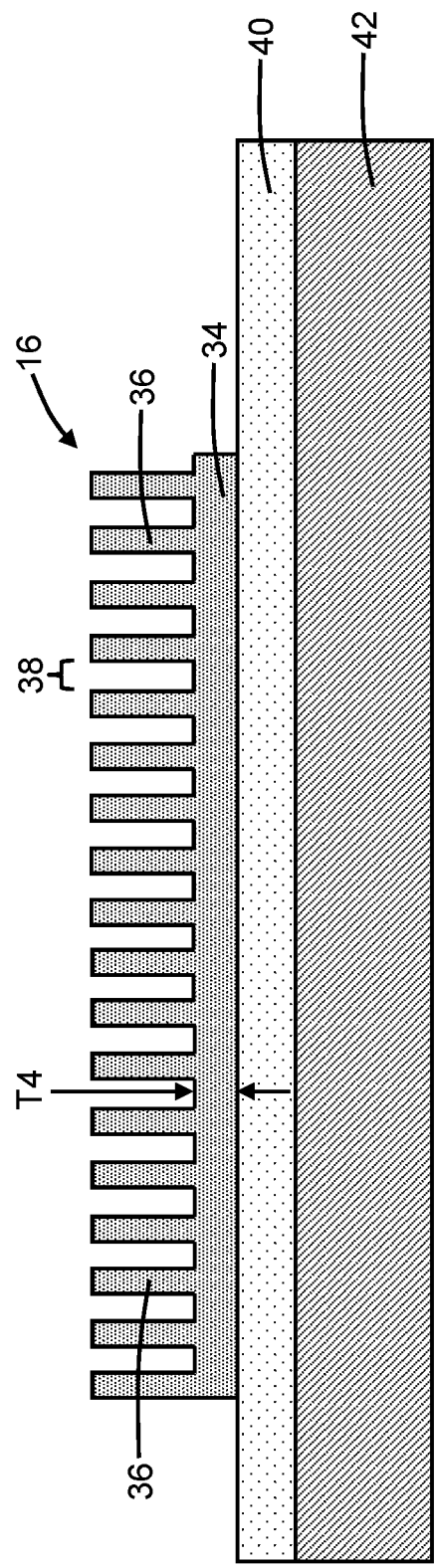
FIG. 2B is a cross-sectional view taken generally along line 2B-2B in FIG. 1.
Figure 2C:
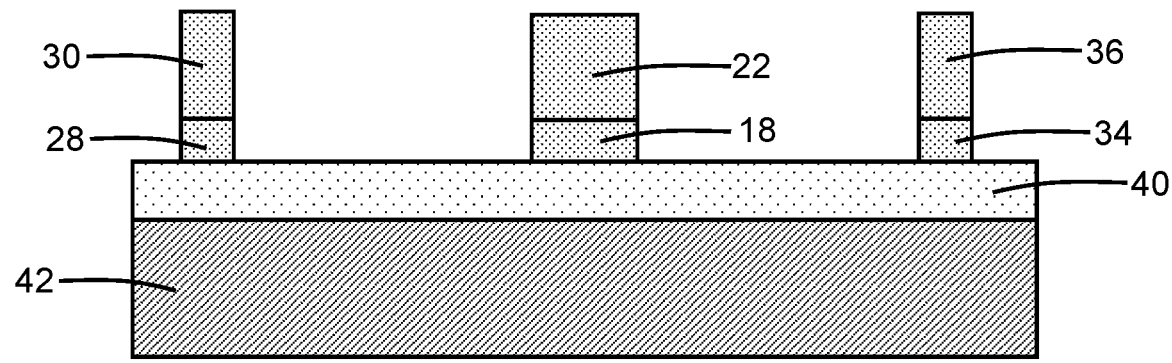
FIG. 2C is a cross-sectional view taken generally along line 2C-2C in FIG. 1.
Figure 2D:
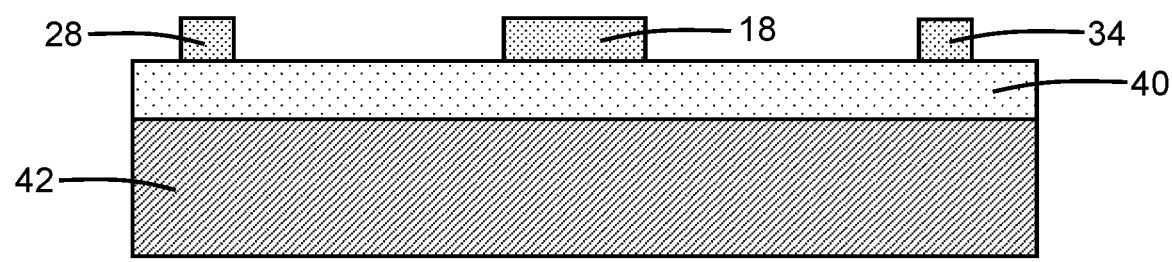
FIG. 2D is a cross-sectional view taken generally along line 2D-2D in FIG. 1.
Figure 2E:
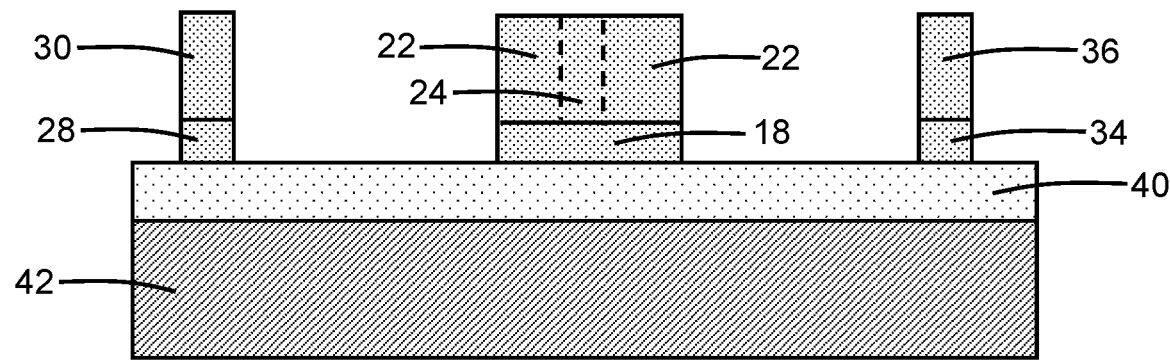
FIG. 2E is a cross-sectional view taken generally along line 2E-2E in FIG. 1.
Figure 2F:
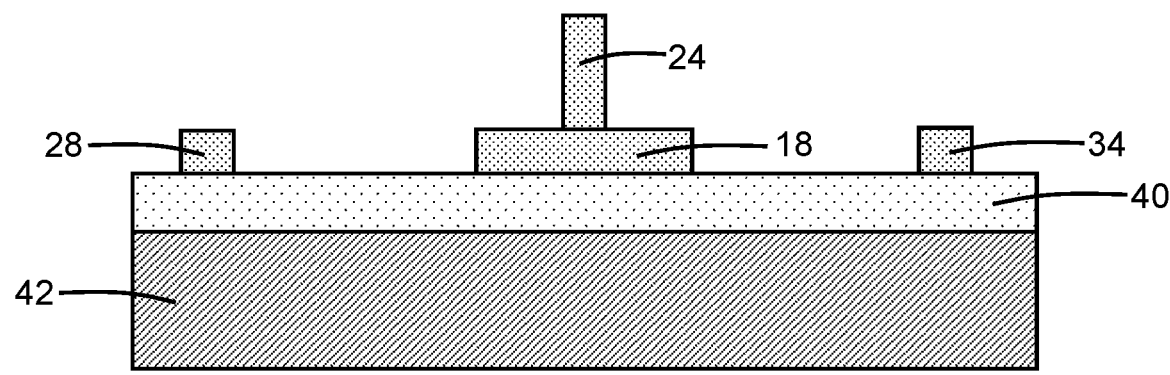
FIG. 2F is a cross-sectional view taken generally along line 2F-2F in FIG. 1.
Figure 3:
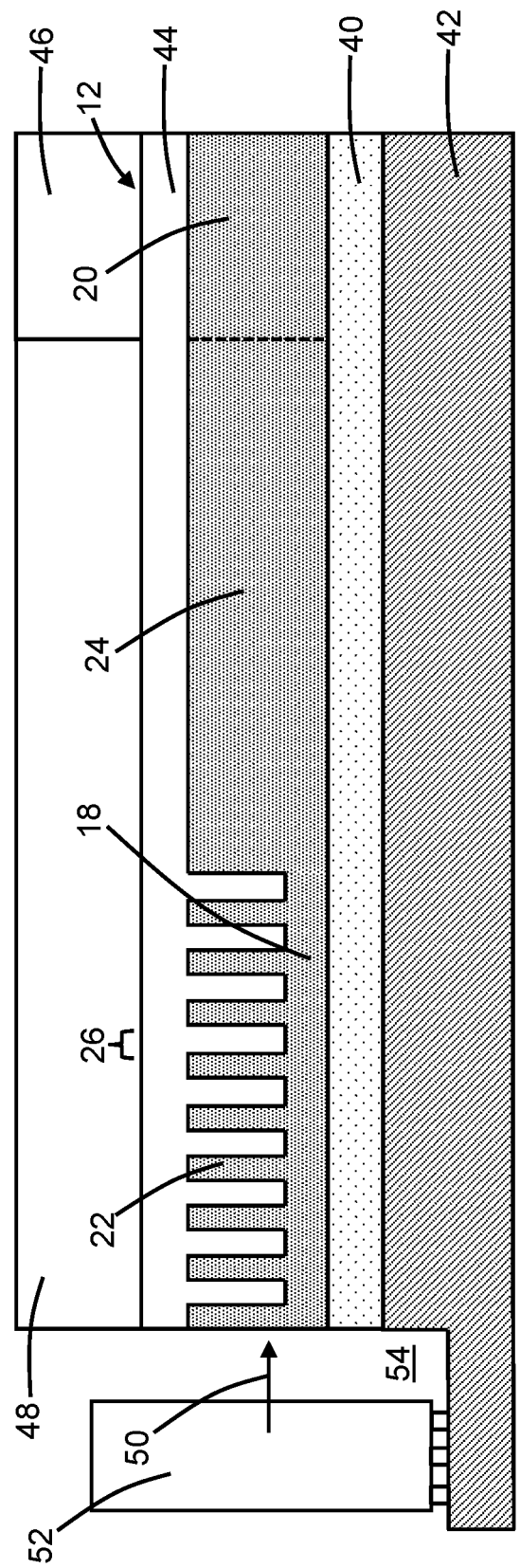
FIGS. 3, 3A, 3B are cross-sectional views of the structure at a fabrication stage of the processing method subsequent to FIGS. 2, 2A, 2B.
Figure 3A:
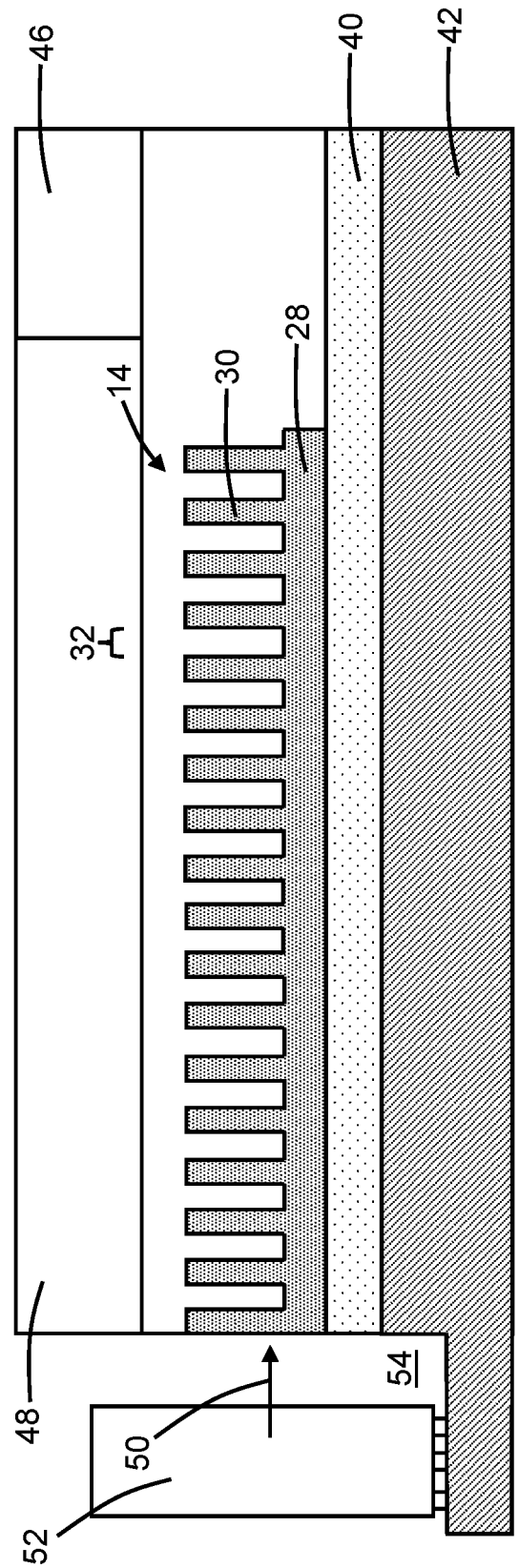
Figure 3B:
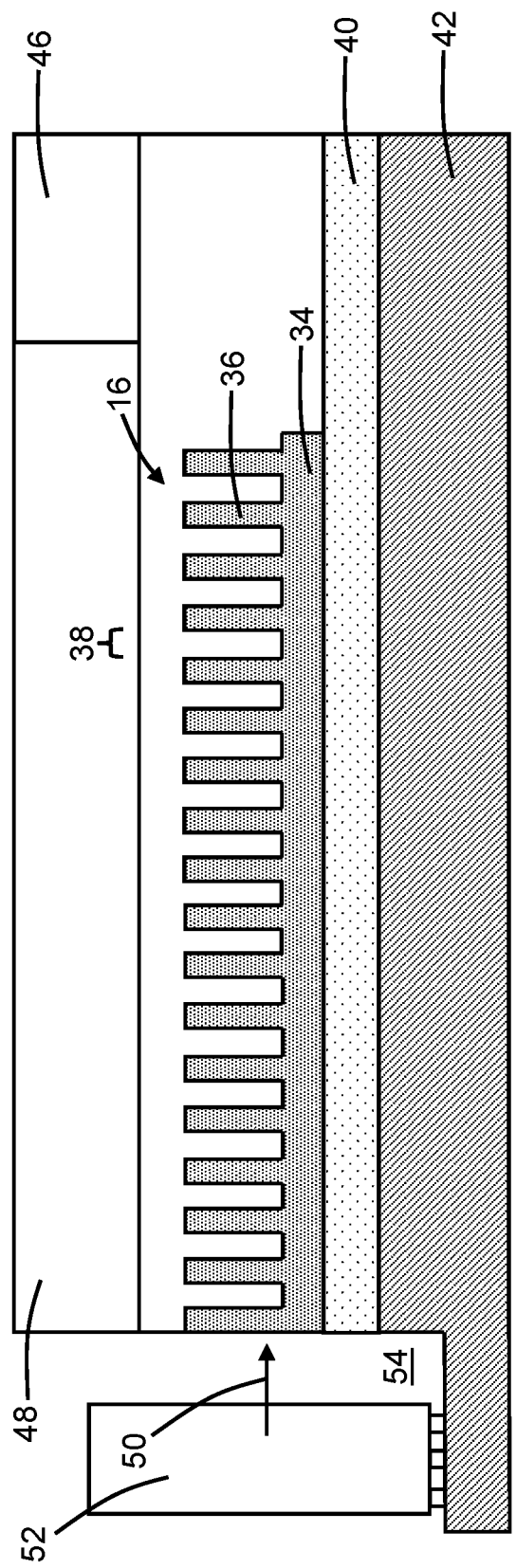

With reference to FIGS. 3, 3A, 3B in which like reference numerals refer to like features in FIGS. 2, 2A, 2B and at a subsequent fabrication stage, a dielectric layer 44 is formed over the waveguide cores 12, 14, 16. The dielectric layer 44 may be comprised of a dielectric material, such as silicon dioxide, that is deposited and then planarized following deposition. In the representative embodiment, the waveguide cores 12, 14, 16 are embedded in the dielectric layer 44. The dielectric material constituting the dielectric layer 44 may have a refractive index that is less than the refractive index of the material constituting the waveguide cores 12, 14, 16.

The dielectric material of the dielectric layer 44 is disposed in the gaps 26 between adjacent pairs of the segments 22 and over the section 18, in the gaps 32 between adjacent pairs of the segments 30 and over the section 28, and in the gaps 38 between adjacent pairs of the segments 36 and over the section 34. In an embodiment, the dielectric material of the dielectric layer 44 may fully fill the gaps 26, 32, 38. The segments 22 and the dielectric material of the dielectric layer 44 in the gaps 26 may define a metamaterial structure in which the material constituting the segments 22 has a higher refractive index than the dielectric material of the dielectric layer 44. The segments 30 and the dielectric material of the dielectric layer 44 in the gaps 32 may define a metamaterial structure in which the material constituting the segments 30 has a higher refractive index than the dielectric material of the dielectric layer 44. The segments 36 and the dielectric material of the dielectric layer 44 in the gaps 38 may define a metamaterial structure in which the material constituting the segments 36 has a higher refractive index than the dielectric material of the dielectric layer 44. The metamaterial structures can be treated as homogeneous materials each having an effective refractive index that is intermediate between the refractive index of the material constituting the segments 22, 30, 36 and the refractive index of the dielectric material of the dielectric layer 44.

A back-end-of-line stack 46 may be formed over the dielectric layer 44. The back-end-of-line stack 46 may include stacked dielectric layers that are each comprised of a dielectric material, such as silicon dioxide, silicon nitride, tetraethylorthosilicate silicon dioxide, or fluorinated-tetra-ethylorthosilicate silicon dioxide.

The back-end-of-line stack 46 may be removed from above the segmented sections 18, 28, 34 of the waveguide cores 12, 14, 16 and replaced by a dielectric layer 48 comprised of a homogeneous dielectric material, such as silicon dioxide. In an alternative embodiment, a slab layer may be formed from a layer of the back-end-of-line stack 46, and the slab layer may be positioned in a vertical direction between the dielectric layer 44 and the dielectric layer 48. For example, a slab layer comprised of a dielectric material, such as silicon nitride, may be formed over the dielectric layer 44. In an embodiment, the slab layer may be patterned to define a tapered shape. In an embodiment, the slab layer may be patterned to define a non-tapered shape. In an alternative embodiment, a deposited dielectric layer may be patterned to provide an additional set of waveguide cores similar to the waveguide cores 12, 14, 16 that include segmented sections that are positioned over the segmented sections 18, 28, 34 of the waveguide cores 12, 14, 16.

Light (e.g., laser light) may be provided in a mode propagation direction 50 from a light source 52 toward the edge coupler. The light may have a given wavelength, intensity, mode shape, and mode size, and the edge coupler may provide spot size conversion for the light. The light source 52 may be positioned in a cavity 54 patterned in the substrate 42. In an embodiment, the light source 52 may be a semiconductor laser positioned adjacent to the edge coupler, and the semiconductor laser may be attached inside the cavity 54.

The structure 10 leverages a combination of multi-tip metamaterial structures and partially-etched waveguide cores 12, 14, 16 to build a low-loss and compact edge coupler that may be positioned at an edge of a photonics chip for coupling light from either a laser or an optical fiber. The edge coupler may provide the ability to control mode properties for improving system level performance, particularly for larger values (e.g., about 800 nanometers) of the thickness T2. The structure 10 may exhibit a reduced coupling loss due to an improved mode match and/or reduced optical return loss and back reflection. The structure 10 may also permit the relaxation of fabrication requirements for the waveguide cores 12, 14, 16.

Figure 4:
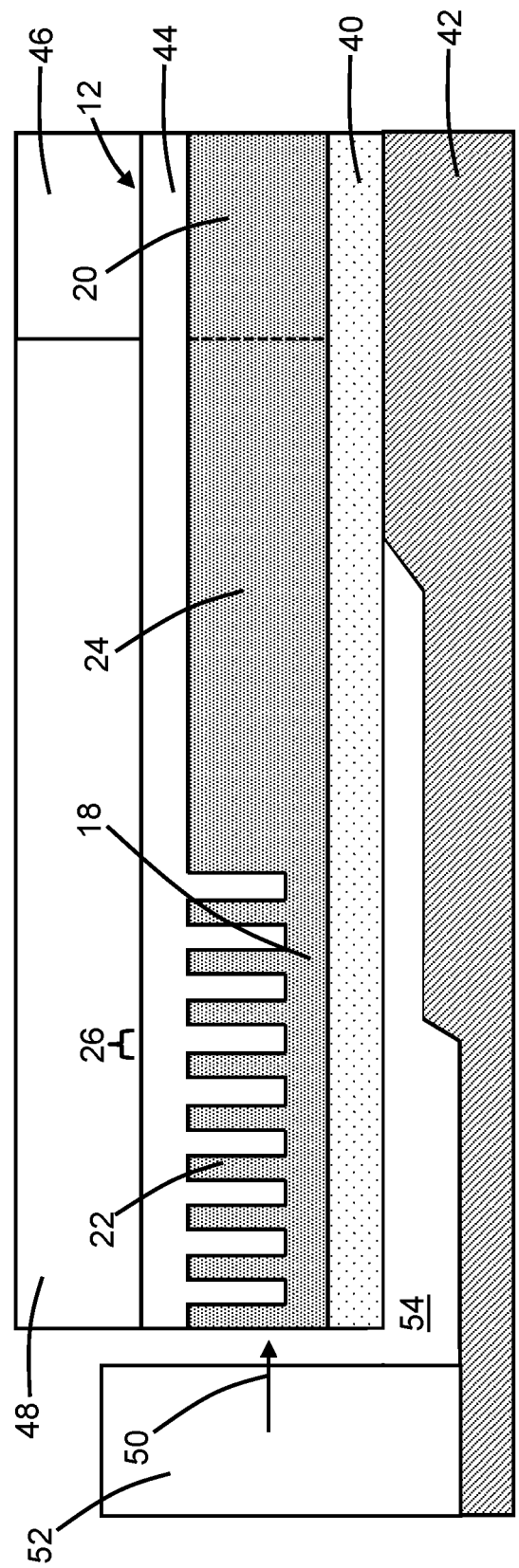
FIG. 4 is a cross-sectional view of a structure in accordance with embodiments of the invention.

With reference to FIG. 4 and in accordance with alternative embodiments of the invention, the light source 52 may be an optical fiber that is positioned in the cavity 54 adjacent to the edge coupler. In an embodiment, the light source 52 may be a single-mode optical fiber. In an embodiment, the light source 52 may be a multi-mode optical fiber. In an embodiment, the cavity 54 may extend as an undercut in the substrate 42 beneath the edge coupler.

Figure 5:
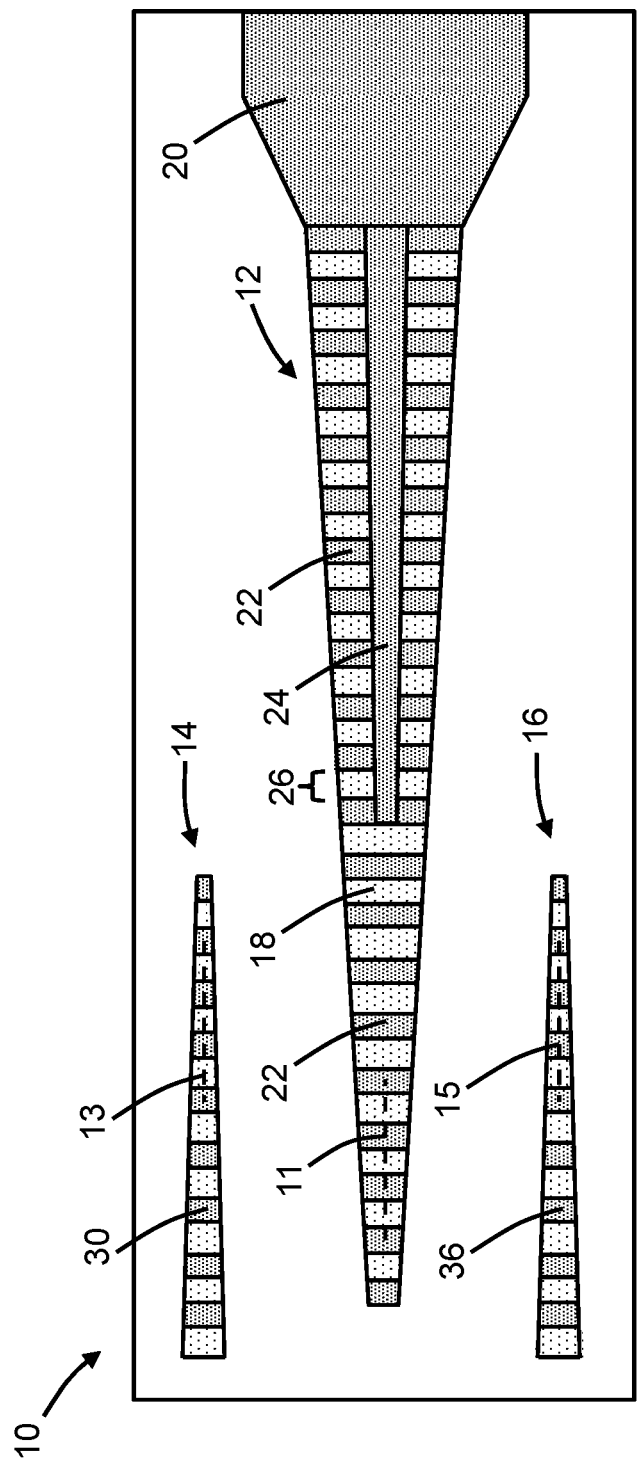
FIG. 5 is a top view of a structure in accordance with embodiments of the invention.

With reference to FIG. 5 and in accordance with alternative embodiments of the invention, the waveguide core 14 and the waveguide core 16 may be modified to have a tapered shape. In an embodiment, the waveguide cores 14, 16 may taper in an opposite direction from the segments 22 and section 18 of the waveguide core 12. In that regard, the width of the waveguide cores 14, 16 may decrease with increasing distance from the light source 52. In an embodiment, the width of the waveguide cores 14, 16 may decrease linearly. In an alternative embodiment, the width of the waveguide cores 14, 16 may decrease based on a non-linear function, such as a quadratic function, a cubic function, a parabolic function, a sine function, a cosine function, a Bezier function, or an exponential function. In an embodiment, the waveguide cores 14, 16 may be longitudinally offset relative to the waveguide core 12.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
an edge coupler including a first waveguide core and a second waveguide core adjacent to the first waveguide core in a lateral direction, the first waveguide core including a first section with a first thickness and a first plurality of segments projecting in a vertical direction from the first section, and the second waveguide core including a second section with a second thickness and a second plurality of segments projecting in the vertical direction from the second section,
wherein the first waveguide core includes a third section with a third thickness, and the first plurality of segments have a first height relative to the first section of the first waveguide core equal to a difference between the first thickness and the third thickness.

2. The structure of claim 1 wherein the edge coupler further includes a third waveguide core adjacent to the first waveguide core in the lateral direction, the third waveguide core including a fourth section with a fourth thickness and a third plurality of segments projecting in the vertical direction from the fourth section.

3. The structure of claim 2 wherein the first waveguide core is positioned in the lateral direction between the second waveguide core and the third waveguide core.

4. The structure of claim 2 wherein the fourth thickness is equal to the second thickness.

5. The structure of claim 1 wherein the first thickness is equal to the second thickness.

6. The structure of claim 1 wherein the second plurality of segments have a second height relative to the second section of the second waveguide core equal to a difference between the third thickness and the second thickness.

7. The structure of claim 1 further comprising:
a light source positioned adjacent to the first waveguide core and the second waveguide core, the light source configured to provide light in a mode propagation direction to the first waveguide core and the second waveguide core.

8. The structure of claim 7 wherein the first waveguide core is terminated by the one of the first plurality of segments, and the second waveguide core is terminated by the one of the second plurality of segments.

9. The structure of claim 7 wherein the light source is a semiconductor laser.

10. The structure of claim 7 wherein the light source is an optical fiber.

11. The structure of claim 7 wherein the first waveguide core has a width that increases with increasing distance from the light source.

12. The structure of claim 7 wherein the second waveguide core has a width that decreases with increasing distance from the light source.

13. The structure of claim 7 wherein the second waveguide core has a width that is constant with increasing distance from the light source.

14. The structure of claim 7 further comprising:
a substrate,
wherein the substrate includes a cavity having an undercut that extends beneath at least a portion of the first waveguide core and the second waveguide core, and the light source is positioned in the cavity.

15. The structure of claim 1 wherein the first waveguide core further includes a rib overlaid with the first section and at least some of the first plurality of segments.

16. The structure of claim 1 wherein the first plurality of segments are separated by a first plurality of gaps, the second plurality of segments are separated by a second plurality of gaps, a dielectric material is positioned in the first plurality of gaps and the second plurality of gaps, the first plurality of segments and the second plurality of segments comprise a first material having a first dielectric constant, and the dielectric material comprises a second material having a second dielectric constant that is less than the first dielectric constant.

17. The structure of claim 16 wherein the first plurality of segments and the dielectric material define a first metamaterial structure, and the second plurality of segments and the dielectric material define a second metamaterial structure.

18. The structure of claim 1 wherein the second waveguide core has a tapered width.

19. A method comprising:
forming an edge coupler including a first waveguide core and a second waveguide core adjacent to the first waveguide core in a lateral direction,
wherein the first waveguide core includes a first section with a first thickness and a first plurality of segments projecting in a vertical direction from the first section, the second waveguide core includes a second section with a second thickness and a second plurality of segments projecting in the vertical direction from the second section, the first waveguide core includes a third section with a third thickness, and the first plurality of segments have a first height relative to the first section of the first waveguide core equal to a difference between the first thickness and the third thickness.

20. The method of claim 19 further comprising:
forming a cavity adjacent to the edge coupler,
wherein the cavity is configured to receive a light source that is positioned adjacent to the first waveguide core and the second waveguide core, and the light source is configured to provide light in a mode propagation direction to the first waveguide core and the second waveguide core.

* * * * *